March 27, 1945.  J. A. RAJCHMAN ET AL  2,372,450

ELECTRON OPTICAL INSTRUMENT

Filed March 28, 1942  3 Sheets-Sheet 1

Inventors
Jan A. Rajchman
& Richard L. Snyder, Jr.

March 27, 1945.   J. A. RAJCHMAN ET AL   2,372,450
ELECTRON OPTICAL INSTRUMENT
Filed March 28, 1942   3 Sheets-Sheet 2

Inventors
Jan A. Rajchman
& Richard L. Snyder, Jr.
By
Attorney

March 27, 1945.  J. A. RAJCHMAN ET AL  2,372,450
ELECTRON OPTICAL INSTRUMENT
Filed March 28, 1942  3 Sheets-Sheet 3

Inventors
Jan A. Rajchman
& Richard L. Snyder, Jr.
Attorney

Patented Mar. 27, 1945

2,372,450

UNITED STATES PATENT OFFICE 2,372,450

ELECTRON OPTICAL INSTRUMENT

Jan A. Rajchman, Philadelphia, Pa., and Richard L. Snyder, Jr., Glassboro, N. J., assignors to Radio Corporation of America, a corporation of Delaware Application March 28, 1942, Serial No. 436,676

19 Claims. (Cl. 250—49.5)

This invention relates to telelectroscopes and especially to electronic image apparatus in which a field comprised of several images is formed and maintained stationary by using a clearly defined point or small portion of the image field to control electrically the focus or position of the remainder of the image field.

In most types of mechanical and electronic image apparatus undesired image movement is caused by refraction of the transmitting medium, or by vibration of the mechanical elements comprising the projection apparatus. Since these image movements are usually very erratic, it is necessary to provide substantially instantaneous control of the telelectroscope image deflection if the final image is to be made stationary. Such control is impractical with mechanical devices but may be readily accomplished by means of electronic deflection compensation.

This invention is an improvement on the apparatus disclosed in the copending U. S. application, Serial No. 360,797, filed October 11, 1940, by V. K. Zworykin. An object of the invention is to provide improved means for compensating for undesired image movement in electronic image devices. Another object is to provide means including an improved electronic target electrode from which currents may be derived which are functions of the movement of an electron beam aimed at the target. Still another object is to provide means including an electron emissive target electrode in which four portions of equal area are associated with suitable electron responsive devices to generate currents proportional to the electronic energy received by each target portion from an electron beam. Still another object is to provide means including an electron emissive target electrode divided into four portions of equal area with any two of which are associated electron responsive devices in quadrature relation.

The invention will be described by reference to the accompanying drawings of which Fig. 1 is a schematic diagram of one embodiment of the invention; Fig. 2 is an enlarged elevational view of the portion of Fig. 1 which includes the target electrode and associated electronic multipliers; Fig. 3 is a plan view of the device shown in Fig. 2; Fig. 4 is a schematic diagram of the power connections to the electron multipliers used in the invention; Fig. 5 is an elevational view of another embodiment of the invention; Fig. 6 is a perspective view of the central portion of the electron multipliers shown in Fig. 5; and Figs. 7 and 8 are plan and perspective views, respectively of a modification of the invention.

Referring to Fig. 1, electronic image tube 1 of the general type described in U. S. Patent 2,189,319 granted to G. A. Morton on Feb. 6, 1940, is located on the longitudinal axis 3 of a telescope which includes the mirror 5 and correcting lens 7. The several parts are supported by any suitable means such as brackets 9. The image tube 1 contains, in addition to the photoelectric image cathode C and electrostatic lens elements L, a mosaic screen 11 which includes an aperture 13. The image tube also contains an electron gun 15 provided with deflecting elements 17 connected to a source of deflecting voltage such as the generator 19. An anode 21 of the image tube 1 and the mosaic screen 11 are connected to the input of an amplifier 23. The output of the amplifier is connected to the control grid and cathode of a cathode ray Kinescope tube 25. The Kinescope tube includes deflecting elements 27 corresponding to the deflecting elements 17 of the electron gun 15 and connected to the generator 19 so that the cathode rays of tube 25 and electron gun 15 are deflected in synchronism. In this way the image formed on the mosaic 11 of the image tube is scanned by the electron gun 15 and reproduced on the fluorescent screen of the Kinescope tube 25.

The device just described forms an electronic telescope in which the light optical image is formed by reflecting light from the mirror, striking the photosensitive image cathode C of the imaging tube and forming an electronic image which is projected on the mosaic screen 11 and reproduced on the fluorescent screen of the Kinescope tube 25. The operation of an electron telescope of this type is described in the above mentioned copending application. It should be understood that the electron gun 15 and Kinescope 25 with associated generator 19 and amplifier 23 may be omitted, and the image viewed directly on the screen 11 as described in Morton U. S. Patent 2,189,319. In either apparatus the image formed on the screen 11 will be subjected to undesired movement originating either at the light source or as a result of variations in the transmitting medium.

The neutralization of these movements is effected by the following means: An initial target forming an electron emissive or deflecting member 29 is located on the longitudinal axis of the image tube 1 immediately below the aperture 13. The electron emissive target member will be described hereinafter. Electrons secondarily emitted from the target electrode 29 as a result of electron bombardment through the aperture 13 will be applied to one or more of four electron emissive surfaces 31 disposed about the longitudinal axis of the image tube. The output electrodes 35 of the electron multipliers are connected respectively to four deflection elements 37 arranged about the longitudinal axis 3 to correspond to the arrangement of the four electrodes 31. The remaining terminals of the deflection elements 37 are connected to the positive terminal of the battery 39 which biases the several electron multiplier electrodes as shown in greater detail in Fig. 3, and as fully disclosed in U. S. Patent 2,125,750 granted on August 2, 1938 to E. G. Ramberg. The details of the multipliers are also fully explained in the Ramberg patent.

In the operation of the device, an image of one of the distinct objects to be viewed is centered on the junction of the intersecting plane surfaces which divide the electron emissive target into four equal portions. Centering may be ascertained by measuring the outputs of the electron multipliers. If the reference portion of the image under observation is centered on the intersecting plane surface, the output currents of the four multipliers will be equal and the deflecting coils 37 will provide equal and opposite fields for the electrons passing to the mosaic screen whereby no compensation will result. If, however, the electrons passing to the target electrode move away from the longitudinal axis because of apparent motion of the distant reference object, one section of the target electrode will have greater secondary emission and its corresponding electron multiplier will actuate the corresponding deflecting element 37 to deflect the electron beam back to its original position. While the aperture 13 has been shown as centrally located in the mosaic screen, it should be understood that the aperture, deflecting elements, target and electron multipliers may be located on the edge of the image field and responsive to a reference image on the circumference of the object.

Also, if desired, the compensation characteristics of the device may be utilized to control image focus instead of, or in addition to, the undesired movement of the image described.

Referring to Fig. 2, the initial electron target shown in Fig. 1 comprises in combination, a dish-shaped electron emissive element 29 having edges 47 normal thereto, and intersecting elements 41 and 42 normal to each other and normal to the electron emissive surface 29 which divide the surface 29 into four equal portions. The electron stream, shown by the dash lines, which passes through the aperture 13 in the screen 11, causes secondary electronic emission from the elements 29 and 47. These secondarily emitted electrons are directed to the elements 31 of the four electron multipliers. The elements 31 are at a positive potential with respect to the electrode 29. The electrodes 43 and 44 are intended for shielding the multipliers from the direct electron beam through the aperture 13. Under normal conditions, the electron beam through the aperture 13 is directed at the intersection 45 of the vanes 41 and 42. It will be apparent that all electrons striking the separate quadratures of the electron emissive target 29 will be directed to the respective electrodes 31 of the electron multiplier associated with the particular portion of the target electrode. If the electron beam is deflected from the intersection of the elements 41 and 42, the number of secondarily emitted electrons directed to each of the four electron multipliers will differ, and the fields of the associated beam deflection elements 37 will substantially compensate for movement of the reference beam from its normal position, as described heretofore.

Figure 5:
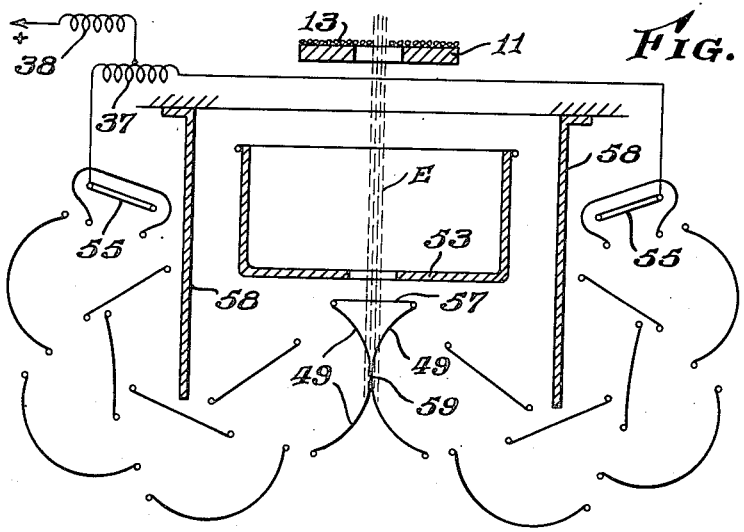

Fig. 5 illustrates an embodiment of the invention in which vertical and horizontal movement of the electron beam corresponding to the reference image can be compensated by the use of only two electron multipliers. Two electron multipliers of the type described in U. S. application Serial No. 287,020, filed by Jan A. Rajchman and Richard L. Snyder, Jr., on July 28, 1939, are provided with a unique common electrode 49 which includes the knife edge 59 and baffle plates 57. Electron beam shielding means 53 are provided to confine the electron beam, passing through the aperture 13 of the screen 11, to the junction of the elements 49 comprising the knife edge 59 and the upper baffle plate 57. Screens 58 are provided to prevent reaction between the various elements of the electron multipliers. The collector electrodes 55 of the two multipliers are connected to opposite terminals of a horizontal deflecting coil 37. The center tap of the horizontal deflecting coil 37 is connected to one terminal of a vertical deflecting coil 38, the other terminal of which is connected to the positive terminal of the battery 39.

Figure 6:
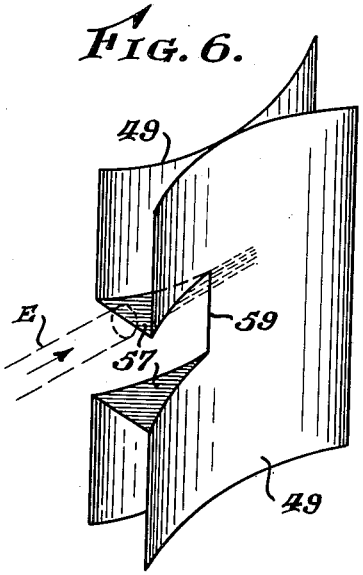

Referring to Fig. 6, the electron beam E, after passing through the aperture 13 of the screen 11, is normally bisected by the knife edge 59 and is also ordinarily bisected at right angles thereto by the upper baffle plate 57. It will be apparent that lateral deflection of the beam caused by movement of the reference image will cause an increase in the output of one multiplier and a decrease in the output of the other. The vertical deflection of the electron beam will cause an equal increase or decrease of both electron multipliers. With the circuit arrangement of the deflection coils 37, described in Fig. 5, lateral deflection is provided by the differential action of the currents in the lateral deflection coils 37 while vertical deflection is provided by the additive currents in the vertical deflection coil 37, since the currents from the two multipliers produce opposing fields in the horizontal deflection coils and are combined to produce an additive field in the vertical deflection coil.

Figure 1:
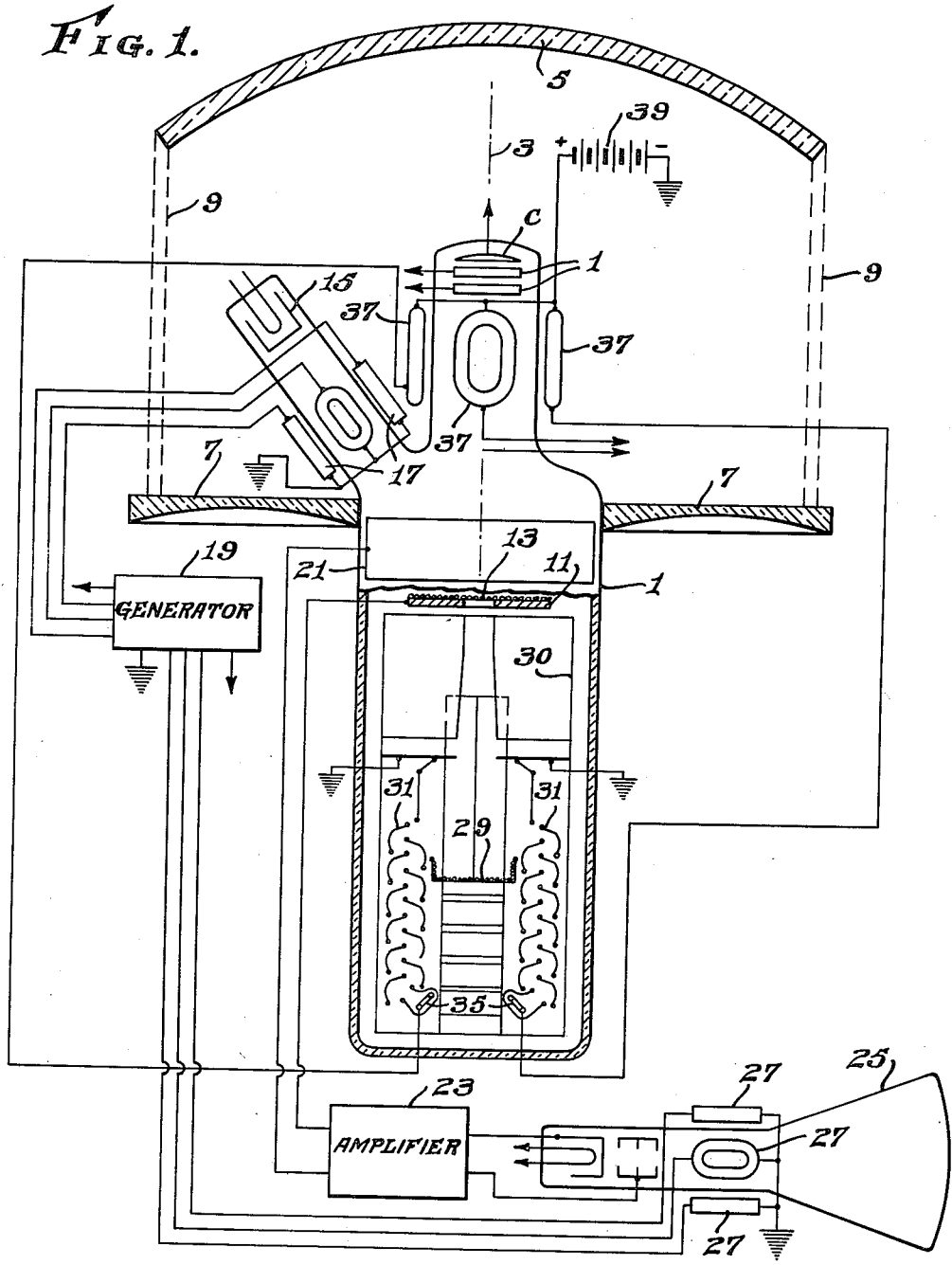
Figure 3:
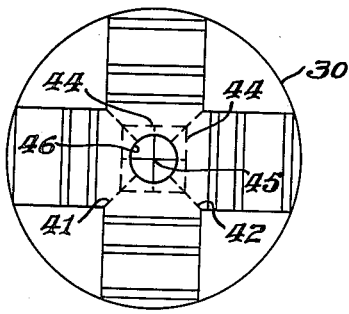
Fig. 3 is a plan view of the device shown in Fig. 2 and shows the arrangement of the vanes with respect to the aperture 46 in the support 30, and the four electron multipliers.
Figure 4:
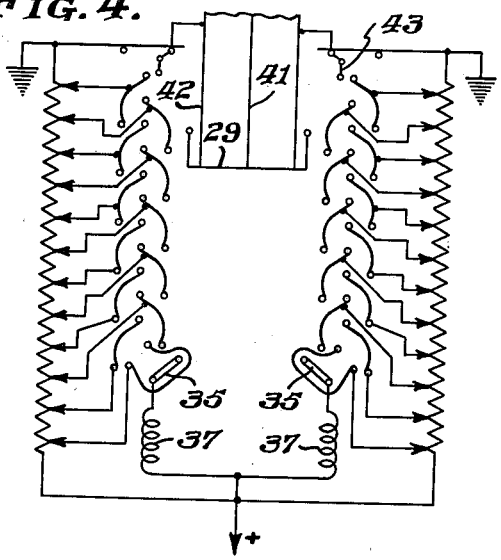
Fig. 4 is a schematic circuit diagram which indicates the manner in which the electrodes of the various multipliers are supplied with suitable potentials, and the manner in which the deflecting coils 37 are connected to the collector electrodes 35 of the four electron multipliers. For the purpose of simplifying the drawings, only two multipliers are shown.
Figure 2:
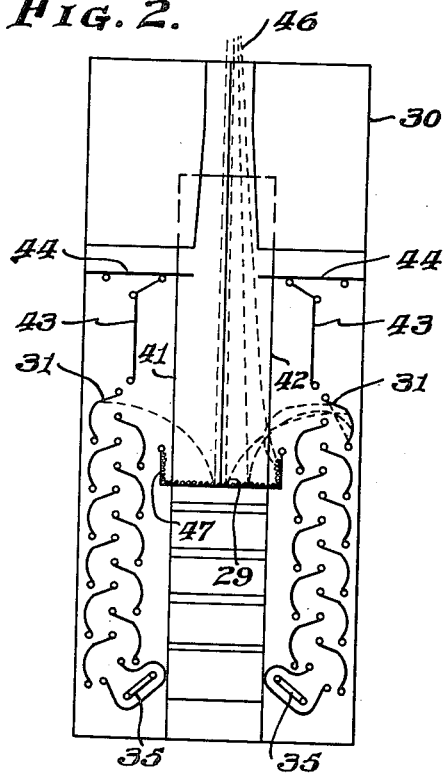
Figure 7:
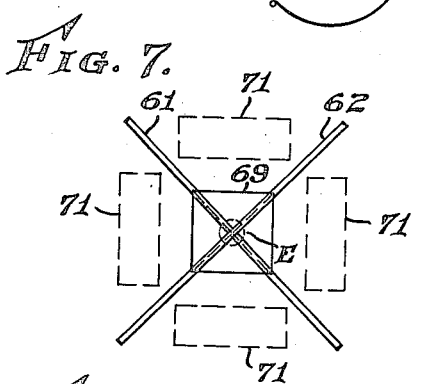
Figure 8:
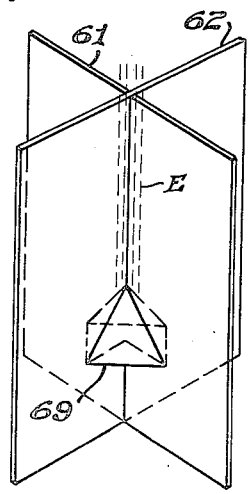

Referring to Figs. 7 and 8, intersecting electrodes 61 and 62 are superimposed on the surface of a conic 69 which is electron emissive. It should be understood that, throughout the specification and claims, the term conic refers to any surface produced by the generation of a line about a fixed point. The conic may have plane, convex or concave faces. The electron beam E, after passing through the aperture 13 of the screen 11, is focused on the intersection of the electrodes 61, 62 as shown by the dashed lines in the drawings and secondarily emitted electrons from four portions of the conic 69 are attracted to electron multipliers 71 associated with each portion of the cone 69. The operation of this modification is essentially the same as that described in Fig. 2.

The modifications described in Figs. 2, 3, 7 and 8 can be used with only two electron multipliers instead of the four described, by utilizing the circuit connection of Fig. 5 for two deflection coils, if the two multipliers are associated with any two adjoining quadrants of the electron emissive target. It should be understood that conventional electron shielding, collecting and focusing electrodes may be associated with the input electrodes of any or all of the electron multipliers, if desired to improve their response characteristics. Also, other conventional electron responsive apparatus may be substituted for the electron multipliers described.

We claim as our invention:

1. In electron image apparatus including means for neutralizing an undesired movement of the image, means including an element of said image for forming an electron beam, an electron emissive electrode in the path of said electron beam, a pair of intersecting electrodes normal to each other and said emissive electrode substantially coaxial with said electron beam to provide four discrete tracks for the secondarily emitted electrons from said emissive electrode, and an electron responsive means in each of said tracks.

2. In electron image apparatus including means for neutralizing an undesired movement of the image, means including an element of said image for forming an electron beam, an electron emissive electrode in the path of said electron beam, a pair of intersecting electrodes normal to each other and said emissive electrode substantially coaxial with said electron beam to provide four discrete tracks for the secondarily emitted electrons from said emissive electrode, and an electron multiplier in each of said paths.

3. In electron image apparatus including means for neutralizing an undesired movement of the image, means including an element of said image for forming an electron beam, an electron emissive target electrode in the path of said beam, a pair of intersecting electrodes normal to each other and said emissive electrode, substantially coaxial with said beam and dividing said target into four equal portions, and an electron responsive means associated with each of said portions.

4. In electron image apparatus including means for neutralizing an undesired movement of the image, means including an element of said image for forming an electron beam, an electron emissive target electrode in the path of said beam, a pair of intersecting electrodes normal to each other and said emissive electrode, substantially coaxial with said beam and dividing said target into four equal portions, and an electron multiplier associated with each of said portions.

5. A device of the type described in claim 1 in which said electron emissive electrode is a conic having its apex in the path of said electron beam.

6. A device of the type described in claim 2 in which said electron emissive electrode is a conic having its apex in the path of said electron beam.

7. A device of the type described in claim 3 in which said electron emissive electrode is a conic having its apex in the path of said electron beam.

8. A device of the type described in claim 4 in which said electron emissive electrode is a conic having its apex in the path of said electron beam.

9. A device of the type described in claim 1 in which said electron emissive electrode is dish shaped having sides substantially normal to its base, said sides extending toward the source of said electron beam.

10. A device of the type described in claim 2 in which said electron emissive electrode is dish shaped having sides substantially normal to its base, said sides extending toward the source of said electron beam.

11. A device of the type described in claim 3 in which said electron emissive electrode is dish shaped having sides substantially normal to its base, said sides extending toward the source of said electron beam.

12. A device of the type described in claim 4 in which said electron emissive electrode is dish shaped having sides substantially normal to its base, said sides extending toward the source of said electron beam.

13. In electron image apparatus including means for neutralizing an undesired movement of the image, means including an element of said image for forming an electron beam, an electron emissive electrode in the path of said electron beam, a pair of intersecting radial electrodes normal to each other and said emissive electrode, substantially coaxial with said electron beam, to provide four discrete tracks for the secondarily emitted electrons from said emissive electrode, and two electron responsive means disposed in quadrature relation associated with any two adjoining tracks.

14. In electron image apparatus including means for neutralizing an undesired movement of the image, means including an element of said image for forming an electron beam, an electron emissive target electrode in the path of said beam, a pair of intersecting radial electrodes normal to each other and said emissive electrode, substantially coaxial with said beam and dividing said target into four equal portions, and two electron responsive means disposed in quadrature relation associated with any two adjoining portions.

15. In electron image apparatus including means for neutralizing an undesired movement of the image, means including an element of said image for forming an electron beam, an electron emissive electrode in the path of said electron beam, a pair of intersecting radial electrodes normal to each other and said emissive electrode, substantially coaxial with said electron beam, to provide four discrete tracks for the secondarily emitted electrons from said emissive electrode, and two electron multipliers disposed in quadrature relation associated with any two adjoining tracks.

16. In electron image apparatus including means for neutralizing an undesired movement of the image, means including an element of said image for forming an electron beam, an electron emissive target electrode in the path of said beam, a pair of intersecting radial electrodes normal to each other and said emissive electrode, substantially coaxial with said beam and dividing said target into four equal portions, and two electron multipliers disposed in quadrature relation associated with any two adjoining portions.

17. In electron image apparatus including means for neutralizing an undesired movement of the image, means including an element of said image for forming an electron beam, an electron emissive electrode in the path of said electron beam, a pair of intersecting radial electrodes normal to each other and said emissive electrode, substantially coaxial with said electron beam, to provide four discrete tracks for the secondarily emitted electrons from said emissive electrode, and electron means associated with said emissive electrode responsive to radial movement of said electron beam.

18. In electronic apparatus including an electron beam, an electron target electrode comprising, in combination, a conic having its apex substantially in the path of said electrons, and a pair of intersecting elements normal to each other and said conic also in the path of said beam, for segregating secondary electronic emission due to the impingement of said beam upon the various quadrants of said conic bounded by said elements.

19. In electronic apparatus including an electron beam, an electron target electrode in the path of said beam comprising two intersecting electron emissive elements, means for radially and angularly deflecting said beam with respect to said elements, and means for deriving currents from said elements proportional in magnitude to a combined function of the radial and angular displacement of said beam.

JAN A. RAJCHMAN.
RICHARD L. SNYDER, Jr.